United States Patent
Chen et al.

(10) Patent No.: US 9,948,189 B2
(45) Date of Patent: Apr. 17, 2018

(54) POWER CONVERSION DEVICE AND METHOD FOR CORRECTING DECISION THRESHOLD LEVEL THEREOF

(71) Applicant: Chicony Power Technology Co., Ltd., New Taipei (TW)

(72) Inventors: Ti-Te Chen, New Taipei (TW); Chao-Yi Huang, New Taipei (TW); Kuo-Cheng Chen, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 2 days.

(21) Appl. No.: 15/162,096

(22) Filed: May 23, 2016

(65) Prior Publication Data

US 2017/0338743 A1 Nov. 23, 2017

(51) Int. Cl.
*H02M 3/335* (2006.01)
*H02M 1/08* (2006.01)

(52) U.S. Cl.
CPC ......... *H02M 3/33507* (2013.01); *H02M 1/08* (2013.01)

(58) Field of Classification Search
CPC .. Y02B 70/16; Y02B 70/126; Y02B 70/1433; H02M 3/33507; H02M 3/33523; H02M 2001/0032; H02M 2001/0035; H02M 3/156; H02M 2001/0006; H02M 1/08; H02M 1/36; H02M 1/4225; H02M 2001/0009
See application file for complete search history.

(56) References Cited

U.S. PATENT DOCUMENTS

| 2010/0039836 A1* | 2/2010 | Gong | H02M 3/156 363/21.13 |
| 2015/0303816 A1 | 10/2015 | Tumminaro et al. | |
| 2015/0318777 A1 | 11/2015 | Pasqua et al. | |

FOREIGN PATENT DOCUMENTS

| TW | 201545454 A | 12/2015 |
| TW | 1520461 B | 2/2016 |

OTHER PUBLICATIONS

Office Action dated November 7, 2016 of the Corresponding Taiwan Patent Application No. 105111443.

* cited by examiner

*Primary Examiner* — Henry Lee, III
(74) *Attorney, Agent, or Firm* — Chun-Ming Shih; HDLS IPR Services

(57) ABSTRACT

A power conversion device and a method for correcting decision threshold level thereof are disclosure. The method for correcting awaking-voltage of a power conversion device is provided. The method includes: fixing an output current of the power conversion module; monitoring a real decision threshold level of the power conversion module when the power conversion module departs from a burst mode; adjusting a preset decision threshold level based on the comparison between the real decision threshold level and the preset decision threshold level to make the preset voltage be equal to the real decision threshold level.

7 Claims, 3 Drawing Sheets

POWER CONVERSION DEVICE AND METHOD FOR CORRECTING DECISION THRESHOLD LEVEL THEREOF

BACKGROUND

Technical Field

The present disclosure relates to a power conversion technique. More particularly, the present disclosure relates to a method for correcting a decision threshold level of power conversion devices which specifications are the same.

Description of Related Art

In general, switching mode power supply apparatus is an apparatus for converting an alternating current (AC) power supplied from a commercial power source into a direct current (DC) power to supply power suitable to the capacity required for various home appliances and electronic systems. Switch-mode power supplies are currently used as they are lighter, smaller, less expensive and higher efficiency than other power supplies. The environmental protection regulation has become stricter and stricter all over the world, and power conversion devices during light load condition also have severe standards for power consumption.

When load is low, the power conversion device enters a burst mode to reduce power consumption. During burst mode control, the controller of the power conversion device provides output regulation by turning on and turning off the switch for an interval of time (also referred to as a burst interval) followed by an interval of no switching. This gives the equivalent switching frequency to be decreased for increasing the operating efficiency by reducing the switching loss and power consumption.

However, when the output power drops to a specific value, an audio noise sensitive by human ears is generated by the capacitor(s) and the inductor(s) of the power conversion device which are resonant. Moreover, the component errors of the capacitor and the inductor of the power conversion device make the frequency for generating the audio noise with the same specifications are different, and thus different audio noises are caused.

Furthermore, during light load condition, the decision threshold level of each power conversion device exits the burst mode operation is different, and thus the light load efficiency of the power conversion devices with the same specification is different.

SUMMARY

According to one aspect of the present disclosure, a method for correcting decision threshold level of a power conversion device is provided. in particular, in the method, an output current of the power conversion module for exiting a burst mode is fixed. In addition, a real decision threshold level of the power conversion module is monitored. The real decision threshold level of the power conversion module is a level which the power conversion device departs from a burst mode. Furthermore, a preset decision threshold level is adjusted based on a comparison between the real decision threshold level and the preset decision threshold level to make the preset decision threshold level be the same as the real decision threshold level.

According to another aspect of the present disclosure, a power conversion device includes a power conversion module, a control unit, and a variable resistor. The control unit providing a preset decision threshold level is electrically connected to the power conversion module, wherein the preset decision threshold level is a level which the power conversion device departs from a burst mode. The variable resistor is electrically connected to the control unit. When the real decision threshold level is different from the preset decision threshold level, the preset decision threshold level is adjusted in accordance with a comparison between the real decision threshold level and the preset decision threshold level to make the preset decision threshold level be equal to the real decision threshold level.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
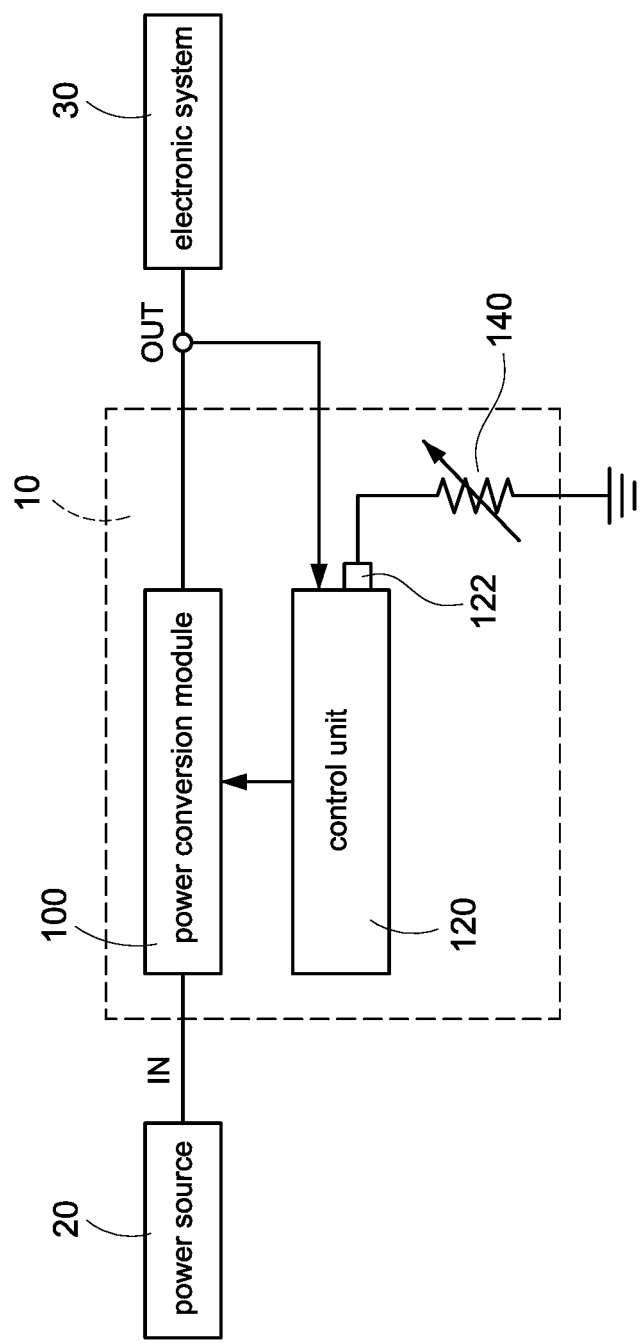
FIG. 1 is a circuit block diagram of a power conversion device according to a first embodiment of the present disclosure.

Reference is made to FIG. 1, which is a circuit block diagram of a power conversion device according to a first embodiment of the present disclosure. The power conversion device 10 includes a power conversion module 100, a control unit 120, and a variable resistor 140. The power conversion module 10 includes an input terminal IN and an output terminal OUT, the input terminal IN is electrically connected to a power source 20, and the output terminal OUT is electrically connected to an electronic system 30. The electronic system 30 is, for example, a personal computer, which can operate under a light load condition and a non-light load condition (or called normal operating mode) based on operating currents required for operations, and the operation current required for the power system 30 when operates under the light load condition is lower than that of operates under the non-light load condition.

When the electronic system 30 is under the light load condition, the power conversion device 10 enters a burst mode for low output current. Specifically, the burst mode is a driving mode for the power conversion device 10 to output low output currents through alternately modulating the switch(es) of the power conversion module 100 based on a high frequency signal within a period of time, and in another period of time the switch is kept off. Thus, the equivalent switching frequency is decreased to increase the operating efficiency by reducing the switching loss and power consumption. When the electronic system 30 is under the non-light load condition, the power conversion device 10 exits from the burst mode and enters, for example, a pulse-width-modulation (PWM) mode for high output currents. The PWM mode control adapts a fixed switching frequency and changing a pulse width for adjusting the output currents.

Figure 2:
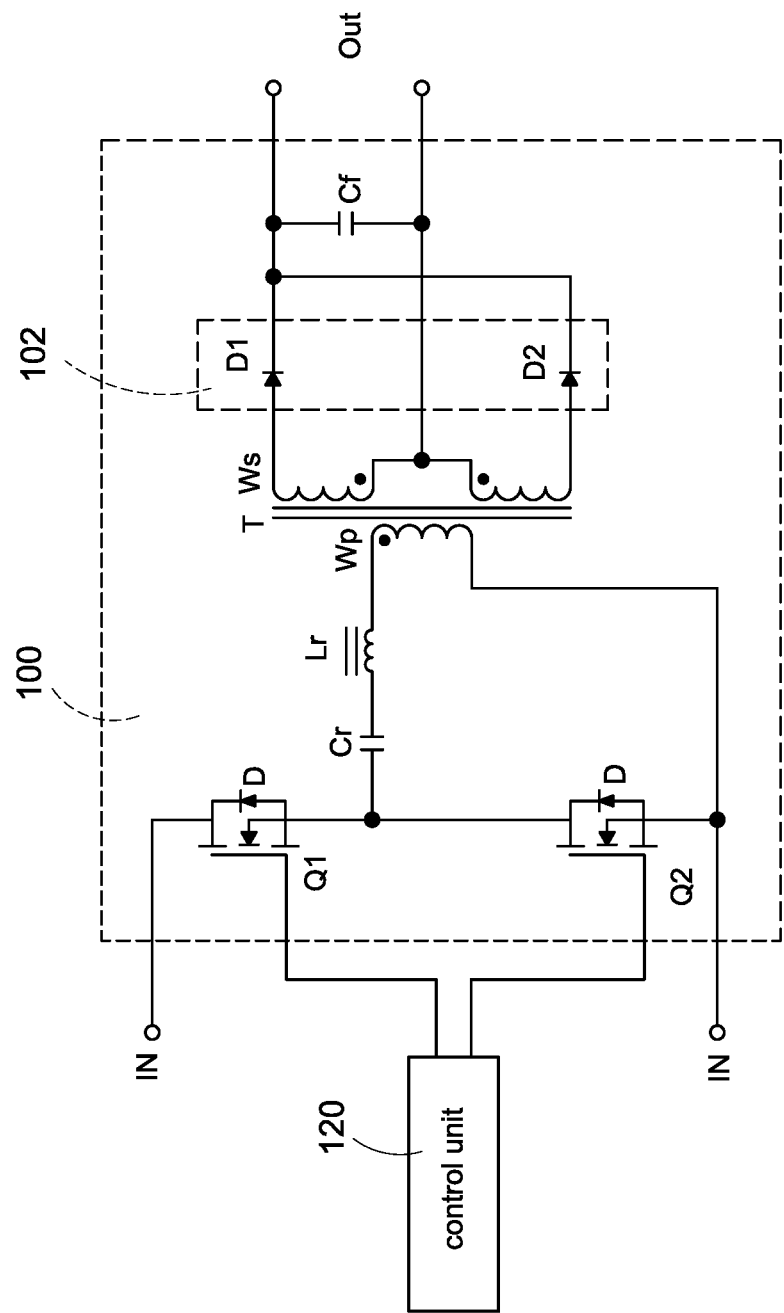
FIG. 2 is a circuit diagram of the power conversion module according to the first embodiment of the present disclosure.

The power conversion module 100 is connected to the input terminal IN and the outputted terminal OUT. The power conversion module 100 is, for example, an LLC resonant power conversion module. Reference is made to FIG. 2, which is a circuit diagram of the power conversion module according to the first embodiment of the present disclosure. For sake of convenient explanation, FIG. 2 also illustrates control unit 120. In FIG. 2, the power conversion module 100 includes power switches Q1 and Q2, a resonant capacitor Cr, a resonant inductor Lr, a transformer T, a rectifying unit 102, and an output filter Cf.

The power switches Q1 and Q2 are, for example, metal-oxide-semiconductor field-effect transistors (MOSFETs). The gates of the power switches Q1 and Q2 are electrically connected to the control unit 120. The power conversion module 100 may further includes two diodes D electrically connected the power switches Q1 and Q2. Specifically, the cathode of each diode D is connected to one of the drain of the power switches Q1 and Q2, and the anode thereof is connected to one of the source of the power switches Q1 and Q2. The diodes D are, for example, parasitic diodes of the power switch Q1 and Q2.

The drain of the power switch Q1 and the source of the power switch Q2 are electrically connected to the input terminal IN for receiving power provided by the power source 20. The gates of the power switches Q1 and Q2 receive signals provided by the control unit 120 and then a square wave corresponding to on/off states of the power switches Q1 and Q2 is generated. The resonant capacitor Cr is connected to the source of the power switch Q1 and the drain of the power switch Q2 such that the resonant capacitor Cr receives the square wave corresponding to on/off states of the power switches Q1 and Q2. The resonant inductor Lr is electrically connected to the resonant capacitor Cr and a primary winding Wp of the transformer T. The resonant capacitor Cr is not only used for blocking DC component of the square wave but also constructing a resonant tank with the resonant inductor Lr and the primary winding Wp of the transformer T.

The rectifying circuit 102 includes two rectifying diodes D1 and D2. The rectifying diodes D1 and D2 are electrically connected to secondary windings Ws of the transformer T such that a full-bridge rectifying circuit is formed to convert an alternative current (AC) power outputted from the transformer T into a direct current (DC) power with high-frequency ripple component. The output filter Cf is a capacitor and configured to filter high-frequency ripple component of the DC power outputted from the diode D1 and D2 and outputs a stable DC power.

With refer again to FIG. 1, the control unit 120 is electrically connected the power conversion module 100 and configured to control operations of the power conversion module 100 based on, for example, the operating current required for the power system 30. Specifically, when the power system 30 is under light load condition, the control unit 30 outputs signals which equivalent switching frequency is decreased to the power switches Q1 and Q2 to make the power conversion module 100 enter the burst mode, thus the current outputted from the power conversion module 100 is decreased. In contrast, when the electronic system 30 is under the non-light load condition, the control unit 120 outputs signals which equivalent switching frequency is increased to the power switches Q1 and Q2 to make the power conversion module 100 exit the burst mode, thus the current outputted from the power conversion module 100 is increased.

The control unit 120 provides a preset decision threshold level. The control unit 120 with the preset decision threshold level is configured to determine whether the power conversion module 100 exits the burst mode or not based on a comparison between a feedback signal (or called a real decision threshold level) from the output terminal OUT and the preset decision threshold level. Specifically, when the real decision threshold level is higher than or equal to the preset decision threshold level, the power conversion module 100 exits the burst mode; however, when the real decision threshold level is lower than the preset decision threshold level, the power conversion module 100 enters the burst mode.

The control unit 120 can be an integrated circuit, and provides an operation mode selecting pin 122. The operation mode selecting pin 122 is used for selecting the mode of the power conversion module 100 operation. The operation mode selecting pin 122 sets the preset decision threshold level for determining whether the power conversion device 10 exits the burst mode or not.

The variable resistor 140 is electrically connected to the operation mode selecting pin 122 of the control unit 120. Through varying the resistance of the variable resistor 140, it is possible to adjust preset decision threshold level. This gives the uses the ability to set the preset decision threshold level to satisfy with the real decision threshold level.

Ideally, the real decision threshold level is equal to the preset decision threshold level. However, component errors make the real decision threshold level departs from the preset decision threshold level. This arranges the power conversion module 100 to advance or postpone exiting the burst mode. Thus the present decision threshold level needs to be corrected.

When the real decision threshold level is lower than the preset decision threshold level, the power conversion module 100 is arranged to postpone exiting the burst mode, thus the preset decision threshold level is adjusted by varying the resistance of the variable resistor 140 for lowering the preset decision threshold level until the preset decision threshold level is equal to the real decision threshold level. In contrast, when the real decision threshold level is higher than the preset decision threshold level, the power conversion module 100 is arranged to advance to exit the burst mode, thus the preset decision threshold level is adjusted by varying the resistance of the variable resistor 140 for heightening the preset decision threshold level until the preset decision threshold level is equal to the real decision threshold level. As such, the power conversion devices 10 with same specification can have same audio noise and light load efficiency.

To sum up, the power conversion device 10 of the present disclosure provides the ability to adjust the preset decision threshold level for making the preset decision threshold level be equal to the real decision threshold level. The method for correcting the preset decision threshold level includes the steps of:

Step 1. Fixing the output current of the power conversion device 10, wherein the fixed output current is equal to a current that makes the power conversion module exit the burst mode.

Step 2. A real decision threshold level of the power conversion module 100 is monitor. The real decision threshold level of the power conversion module 100 is a level which the power conversion device departs from the burst mode.

Step 3. A preset decision threshold level is adjusted based on the comparison between the real decision threshold level and the preset decision threshold level to make the preset decision threshold level be equal to the real decision threshold level.

The preset decision threshold level can be automatically adjusted while the power conversion device 10 is well assembled. However, the preset decision threshold level can also be adjusted by operators through the resistor 140 electrically connected to the operation mode selecting pin 122 of the control unit 120. Specifically, a fixture provided with the variable resistor 140 is assembled with the power conversion device 10, and the variable resistor 140 is electrically connected to the operation mode selecting pin 122, and operators can adjust the preset decision threshold level by varying the resistance of the resistor 140 in accordance with the aforementioned steps accordingly thereafter.

Figure 3:
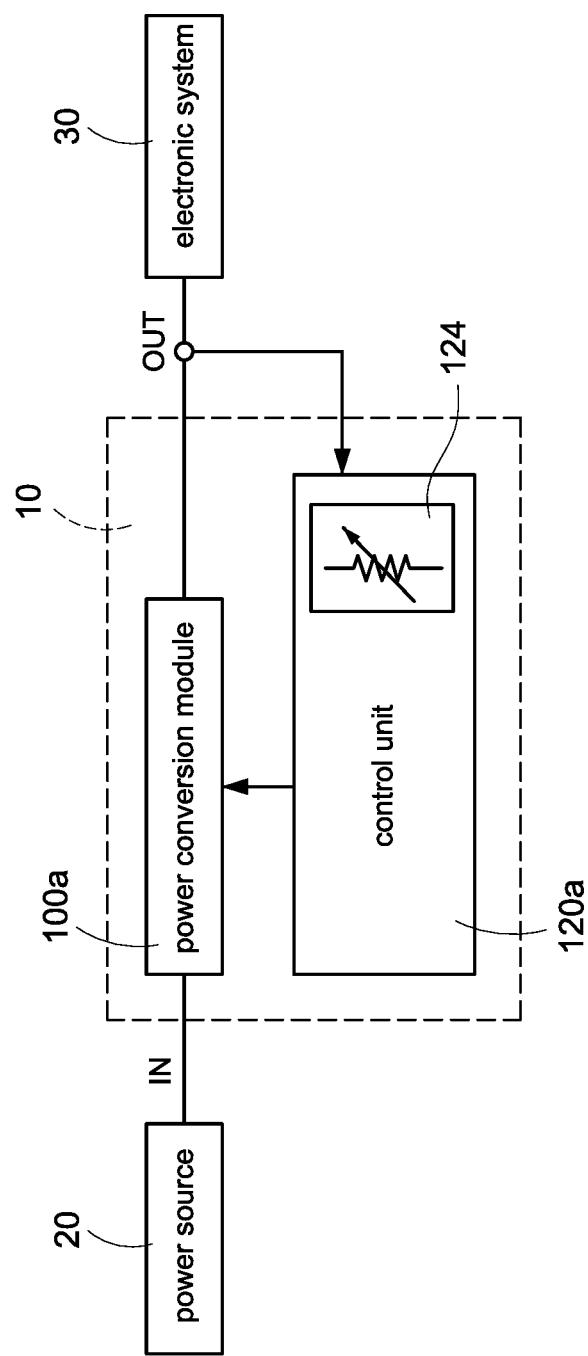
FIG. 3 is a circuit block diagram of a power conversion device according to a second embodiment of the present disclosure.

Reference is made to FIG. 3, which is a circuit block diagram of a power conversion device according to a second embodiment of the present disclosure. The power conversion device 10a is similar to the power conversion device 10 mentioned in the first embodiment, and the same reference numbers are used in the drawings and the description to refer to the same parts. It should be noted that the control unit 120a shown in FIG. 3 can automatically correct the preset decision threshold level.

In FIG. 3, the control unit 120a provides an internal circuit 124 for automatically correcting the preset decision threshold level to make the preset decision threshold level be equal to the real decision threshold level, thus the variable resistor 140 shown in FIG. 2 is omitted.

Although the present disclosure has been described with reference to the foregoing preferred embodiment, it will be understood that the disclosure is not limited to the details thereof. Various equivalent variations and modifications can still occur to those skilled in this art in view of the teachings of the present disclosure. Thus, all such variations and equivalent modifications are also embraced within the scope of the disclosure as defined in the appended claims.

What is claimed is:

1. A method for correcting decision threshold level of a power conversion device comprising:
   a) fixing an output current of the power conversion device;
   b) monitoring a real decision threshold level of the power conversion device, wherein the real decision threshold level of the power conversion device is a voltage which the power conversion device departs from a burst mode;
   c) providing a variable resistor, wherein the variable resistor is electrically connecting to the power conversion device; and
   d) adjusting a preset decision threshold level by varying a resistance of the variable resistor based on a comparison between the real decision threshold level and the preset decision threshold level to make the preset decision threshold level be equal to the real decision threshold level.

2. The method of claim 1, wherein the resistance of the variable resistor is varied according to a voltage comparison between the real decision threshold level and the preset decision threshold level.

3. The method of claim 1, where step a, b, d is performed by a control unit.

4. The method of claim 1, wherein in the step for fixing the output current of the power conversion device, the fixed output current is equal to a current that makes the power conversion module exit the burst mode.

5. A power conversion device comprising:
   a power conversion module;
   a control unit electrically connected to the power conversion module, wherein the control unit providing a preset decision threshold level, and the preset decision threshold level is a voltage which the power conversion module exits from a burst mode; and
   a variable resistor connected to an operation mode selecting pin of the control unit for setting the preset decision threshold level,
   wherein when a real decision threshold level of the power conversion module is different from the preset decision threshold level, the control unit varies the resistance of the variable resistor based on a comparison between the real decision threshold level and the preset decision threshold level to make the preset decision threshold level be equal to the real decision threshold level.

6. The power conversion device of claim 5, wherein the control unit automatically varies the resistance of the variable resistor to make the preset decision threshold level be equal to the real preset-voltage.

7. The power conversion device of claim 5, wherein the power conversion module is LLC resonant power conversion module.

* * * * *